US012561762B2

(12) United States Patent
Bai et al.

(10) Patent No.: US 12,561,762 B2
(45) Date of Patent: Feb. 24, 2026

(54) IMAGE PROCESSING METHOD, DEVICE, AND STORAGE MEDIUM

(71) Applicant: Beijing Shiyan Technology Co., Ltd., Beijing (CN)

(72) Inventors: Guang Bai, Beijing (CN); Zhongyuan Wu, Beijing (CN); Xue Dong, Beijing (CN); Fei Yang, Beijing (CN); Jiankang Sun, Beijing (CN)

(73) Assignee: BEIJING SHIYAN TECHNOLOGY CO., LTD., Beijing (CN)

( * ) Notice: Subject to any disclaimer, the term of this patent is extended or adjusted under 35 U.S.C. 154(b) by 182 days.

(21) Appl. No.: 18/557,955

(22) PCT Filed: Feb. 24, 2023

(86) PCT No.: PCT/CN2023/078010
§ 371 (c)(1),
(2) Date: Oct. 30, 2023

(87) PCT Pub. No.: WO2023/202216
PCT Pub. Date: Oct. 26, 2023

(65) Prior Publication Data
US 2024/0221125 A1      Jul. 4, 2024

(30) Foreign Application Priority Data
Apr. 19, 2022     (CN) ......................... 202210411317.9

(51) Int. Cl.
G06T 5/50          (2006.01)
G06F 3/01          (2006.01)
G06T 7/62          (2017.01)

(52) U.S. Cl.
CPC ................ G06T 5/50 (2013.01); G06F 3/013 (2013.01); G06T 7/62 (2017.01); G06T 2207/20221 (2013.01)

(58) Field of Classification Search
CPC ...................................................... G06T 5/50
See application file for complete search history.

(56) References Cited

U.S. PATENT DOCUMENTS

| | | | |
|---|---|---|---|
| 2016/0007016 A1* | 1/2016 | Holliman | ............. H04N 13/383 348/54 |
| 2018/0286105 A1 | 10/2018 | Surti et al. | |

(Continued)

FOREIGN PATENT DOCUMENTS

| | | |
|---|---|---|
| CN | 107203270 A | 9/2017 |
| CN | 107516335 A | 12/2017 |

(Continued)

OTHER PUBLICATIONS

Office Action issued on Dec. 28, 2024, in corresponding Chinese patent Application No. 202210411317.9, 15 pages.

*Primary Examiner* — Shivang I Patel
(74) *Attorney, Agent, or Firm* — XSENSUS LLP

(57) ABSTRACT

An image processing method is applied to an electronic device having a display and includes: obtaining pupil coordinates of a user at a current moment; determining a fixation region and a non-fixation region corresponding to the display at the current moment according to the pupil coordinates; rendering an image corresponding to the fixation region according to a first resolution, and rendering an image corresponding to the non-fixation region according to a second resolution, the first resolution being greater than the second resolution; stitching an image corresponding to the fixation region after the rendering and an image corresponding to the non-fixation region after the rendering; and displaying a stitched image on the display.

18 Claims, 9 Drawing Sheets

(56)                    References Cited

U.S. PATENT DOCUMENTS

| | | | |
|---|---|---|---|
| 2018/0350032 A1* | 12/2018 | Bastani | .................. G06T 15/20 |
| 2020/0183166 A1 | 6/2020 | Dai et al. | |
| 2020/0278746 A1 | 9/2020 | Lindh | |

FOREIGN PATENT DOCUMENTS

| | | | |
|---|---|---|---|
| CN | 109766011 A | 5/2019 |
| CN | 109791605 A | 5/2019 |
| CN | 110347265 A | 10/2019 |
| CN | 110855972 A | 2/2020 |
| CN | 111522433 A | 8/2020 |
| CN | 112005156 A | 11/2020 |
| CN | 110008835 B | 7/2021 |
| CN | 114127666 A | 3/2022 |
| CN | 114581583 A | 6/2022 |

* cited by examiner a

Display region

A region

Overlapping region

C region

B region b

Display region   A region

Overlapping region

C region

B region c

Display region

A region

B region (C region)

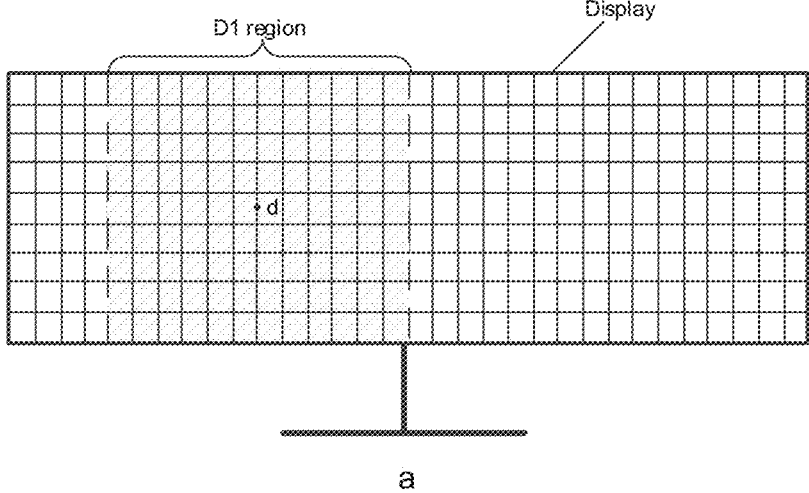
a
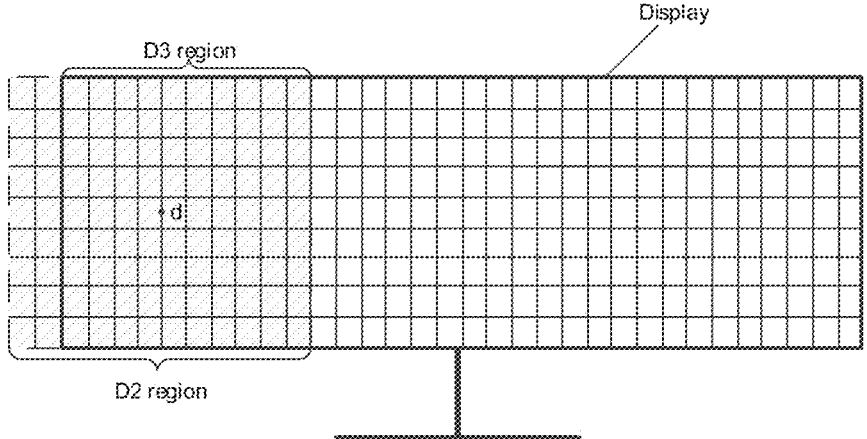
b
FIG. 7

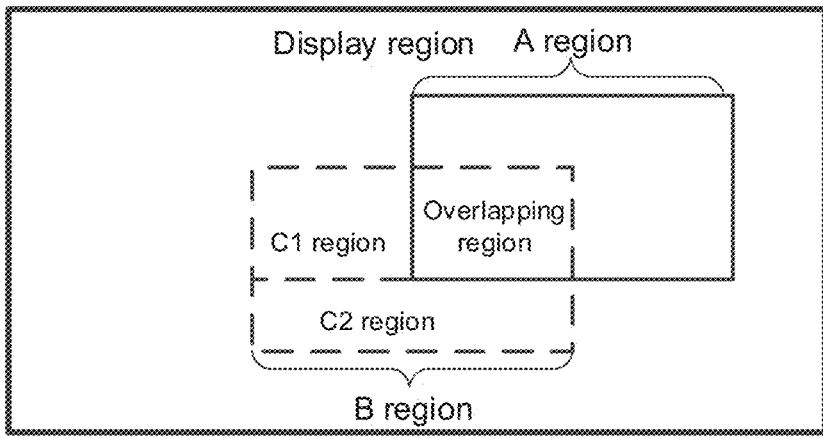
a
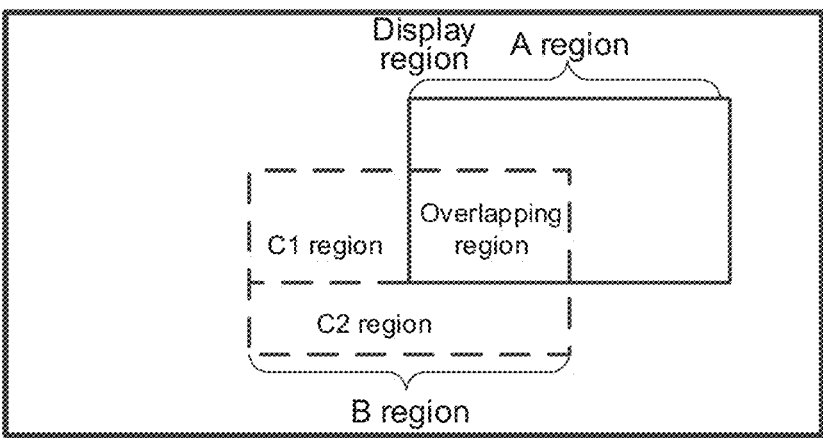
b
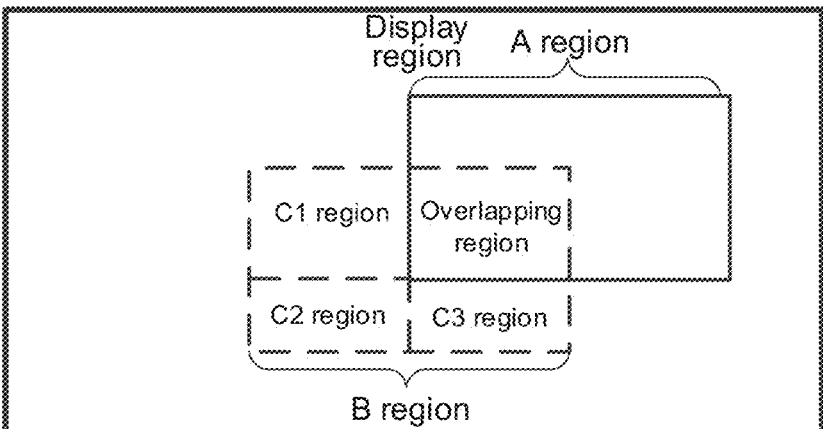
c
FIG. 8

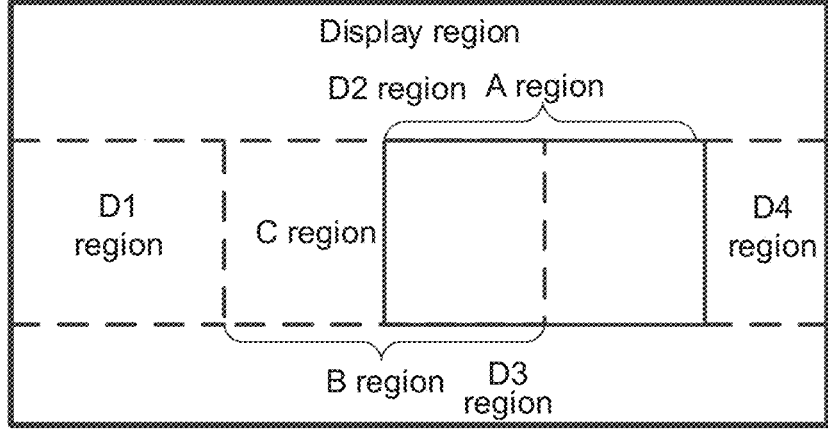

FIG. 9

S1001. Obtain pupil coordinates of a user at a current moment, and determine a fixation region and a non-fixation region of a display at the current moment according to the pupil coordinates S1002. Render an image corresponding to the fixation region according to a first resolution, and render an image according to the non-fixation region according to a second resolution S1003. Stitch an image corresponding to the fixation region after the rendering and an image corresponding to the non-fixation region after the rendering, and display a stitched image on the display

FIG. 10

S1001. Obtain pupil coordinates of a user at a current moment, and determine a fixation region and a non-fixation region of a display at the current moment according to the pupil coordinates S1002. Render an image corresponding to the fixation region according to a first resolution, and render an image according to the non-fixation region according to a second resolution S1201. Render the image corresponding to the fixation region and an image corresponding to a difference region according to a first refresh rate, and render an image according to a low-definition region according to a second refresh rate S1003. Stitch an image corresponding to the fixation region after the rendering and an image corresponding to the non-fixation region after the rendering, and display a stitched image on the display

FIG. 12

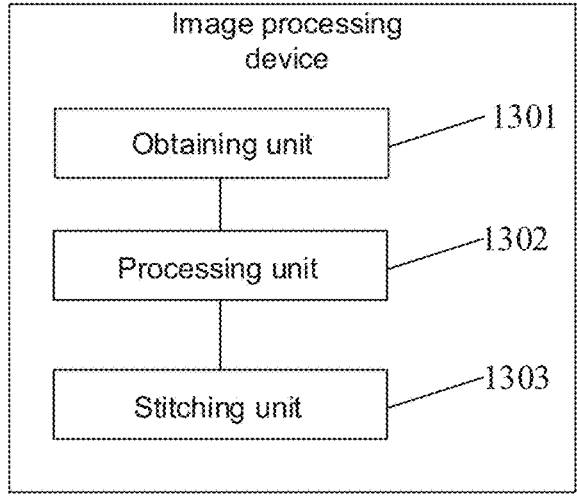

Image processing device

Obtaining unit — 1301

Processing unit — 1302

Stitching unit — 1303

FIG. 13

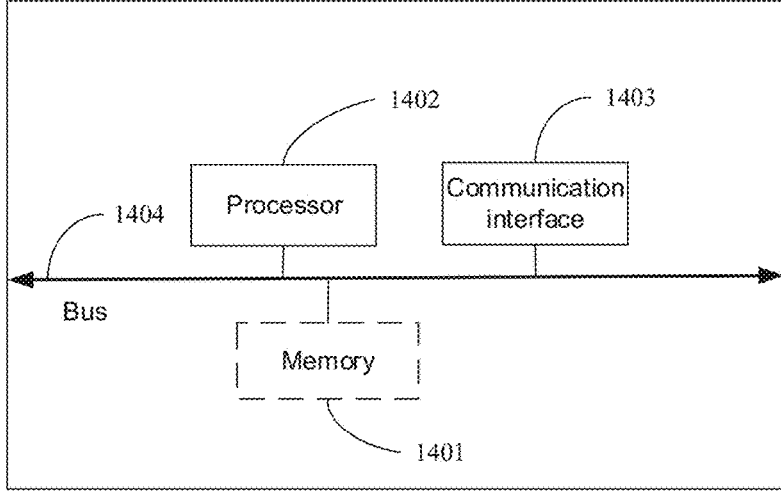

1402 1403

1404 Processor Communication interface

Bus

Memory

IMAGE PROCESSING METHOD, DEVICE, AND STORAGE MEDIUM

CROSS-REFERENCE TO RELATED APPLICATIONS

This application is a national phase entry under 35 USC 371 of International Patent Application No. PCT/CN2023/078010, filed on Feb. 24, 2023, which claims priority to Chinese Patent Application No. 202210411317.9, filed on Apr. 19, 2022, which are incorporated herein by reference in their entirety.

TECHNICAL FIELD

The present disclosure relates to the field of image processing technologies, and in particular, to an image processing method, a device, and a storage medium.

BACKGROUND

With the development of image processing technologies, people have higher and higher requirements for display effect of displays of electronic devices. In order to satisfy the requirements of the users, manufacturers have begun to pursue higher display effect, e.g., adopt screens with high refresh rates, thereby achieving more coherent and smooth dynamic display.

Generally, the electronic device renders each frame of image with full resolution, and displays the rendered image. However, the bandwidth transmission capability of electronic device and the rendering capability of the graphics processing unit (GPU)/graphics card are limited. If the image is rendered at full resolution, it often fails to realize the frame rate that matches the refresh rate of the display and also increases the processing pressure of the GPU. Therefore, reducing the processing pressure of the GPU as much as possible while satisfying the requirements of the users for high-definition content has become an urgent issue to be addressed.

SUMMARY

In an aspect, an image processing method is provided, which is applied to an electronic device having a display. The method includes as follows. The electronic device obtains pupil coordinates of a user at a current moment, and determines a fixation region and a non-fixation region corresponding to the display at the current moment according to the pupil coordinates of the user; the electronic device renders an image corresponding to the fixation region according to a first resolution, and renders an image corresponding to the non-fixation region according to a second resolution, the first resolution being greater than the second resolution; and the electronic device stitches an image corresponding to the fixation region after the rendering and an image corresponding to the non-fixation region after the rendering, and displays an stitched image on the display.

In some embodiments, the non-fixation region includes a difference region and a low-definition region, the difference region is a region other than a first region in a fixation region corresponding to the display at a first moment, the first region is an overlapping region of the fixation region corresponding to the display at the first moment and the fixation region corresponding to the display at the current moment, and the first moment is a previous moment of the current moment; the low-definition region is a region of the display other than the fixation region at the first moment and the fixation region at the current moment; the method further includes: rendering the image corresponding to the fixation region at the current moment and an image corresponding to the difference region according to a first refresh rate, and rendering an image corresponding to the low-definition region according to a second refresh rate, the first refresh rate being greater than the second refresh rate.

In some embodiments, the method of determining the fixation region of the user at the current moment according to the pupil coordinates includes: the electronic device determining screen coordinates corresponding to the pupil coordinates on the display according to the pupil coordinates and a preset screen coordinate determination model; and the electronic device determining a size of the fixation region, and determining the fixation region according to the screen coordinates and the size of the fixation region, the screen coordinates being center coordinates of the fixation region.

In some embodiments, the method of determining the size of the fixation region includes: the electronic device determining a ratio between the fixation region and a display region of the display, the ratio satisfying a preset formula, and the preset formula being $X+X\times N+(1-2X)\times M\times N=K$, where X represents the ratio between the fixation region and the display region of the display, N represents a compression ratio of the image corresponding to the non-fixation region, M represents a refresh ratio of each frame of image corresponding to the non-fixation region, K represents a ratio between an actual resolution of the electronic device at the current moment and a rated resolution of the electronic device; the electronic device determining the size of the fixation region according to a product of the ratio between the fixation region and the display region of the display and the display region of the display.

In some embodiments, the method further includes: determining, by the electronic device, a projection matrix of a target region according to position information of the target region, wherein the target region is any one of the fixation region at the current moment, the difference region and the low-definition region, and the position information includes coordinate information and size information of the target region; and determining, by the electronic device, an image corresponding to the target region according to the projection matrix of the target region.

In some embodiments, the method of stitching the image corresponding to the fixation region after the rendering and the image corresponding to the non-fixation region after the rendering may include: the electronic device stitching, according to a preset format, information of the image corresponding to the fixation region after the rendering and information of the image corresponding to the non-fixation region after the rendering, where information of each image including data of each image and a position of each image in the display region.

In yet another aspect, a non-transitory computer-readable storage medium is provided. The computer-readable storage medium has stored computer program instructions that, when executed by a computer, cause the computer to perform the image processing method as described in any one of the above embodiments.

In yet another aspect, a processing device is provided. The processing device includes a processor and a communication interface, the communication interface is coupled to the processor, and the processor is used to execute a computer program or instructions to implement the image processing method as described in any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

FIG. 7 is a schematic diagram showing a fixation region of a display, in accordance with embodiments of the present disclosure;

FIG. 8 is a schematic diagram showing a process of dividing a difference region of a display, in accordance with embodiments of the present disclosure;

FIG. 9 is a schematic diagram showing a process of dividing a low-definition region of a display, in accordance with embodiments of the present disclosure;

FIG. 10 is a flow diagram showing an image processing method, in accordance with embodiments of the present disclosure;

FIG. 12 is a flow diagram showing another image processing method, in accordance with embodiments of the present disclosure;

FIG. 13 is a schematic diagram of an image processing device, in accordance with embodiments of the present disclosure; and FIG. 14 is a schematic diagram of another image processing device, in accordance with embodiments of the present disclosure.

DETAILED DESCRIPTION

Figure 1:
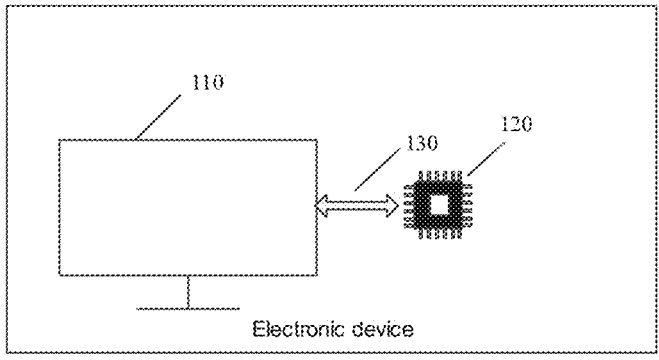
FIG. 1 is a schematic diagram showing a structure of an electronic device, in accordance with embodiments of the present disclosure.

The technical solutions in embodiments of the present disclosure will be described clearly and completely with reference to the accompanying drawings. However, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "multiple", "a plurality of" or "the plurality of" means two or more unless otherwise specified.

In the description of some embodiments, terms such as "coupled" and "connected" and their derivatives may be used. For example, the term "connected" may be used in the description of some embodiments to indicate that two or more components are in direct physical or electrical contact with each other. As another example, the term "connected" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

Additionally, the use of the phrase "based on" is meant to be open and inclusive, since a process, step, calculation or other action that is "based on" one or more of the stated conditions or values may, in practice, be based on additional conditions or value beyond those stated.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Hereinafter, nouns involved in the embodiments of the present disclosure will be explained for the convenience of readers' understanding.

Refresh rate. The refresh rate refers to how many times per second the image displayed by the display device is redrawn, that is, the number of times per second the electronic device is refreshed. It is measured in Hertz (Hz). The higher the refresh rate, the more stable the image, the more natural and clear the displayed image, and the less impact on the eyes of the user. The lower the refresh rate is, the more flickering and jittery the image will be, and the faster the eyes of user will tire. Generally, if the refresh rate above 80 Hz can be achieved, image flicker and jitter can be completely eliminated, and the eyes of the user will not be too easily fatigued.

Resolution. Resolution refers to the number of dots displayed by the display in the horizontal and vertical directions, such as 1024×768, 1280×1024, etc. In 1024×768, "1024" refers to the number of dots in the horizontal direction of the screen, and "768" refers to the number of dots in the vertical direction of the screen. Resolution determines how fine the image is. The higher the resolution of the image, the more pixels the image contains, and the clearer the image.

Generally, in order to satisfy the requirements of the users for high-definition content of the images, each frame of the image needs to be rendered by using a high resolution. Moreover, in order to make the image more stable, the electronic device also needs to use a high refresh rate to render each frame of image. However, the bandwidth transmission capability of the electronic device and the rendering capability of the GPU/graphics card are limited. If the maximum resolution supported by the electronic device is used for image processing, it often fails to realize the frame rate that matches the refresh rate of the electronic device, and the processing pressure of the GPU is also increased. Therefore, there is a need to reduce the processing pressure of the GPU as much as possible while satisfying the requirements of the users for high-definition content.

In addition, the higher the rendering capability of the GPU/graphics card, the higher its price. In order not to increase costs, the rendering capability of the GPU/graphics card needs to be used reasonably. For example, in addition to ordinary 2D displays, multi-viewpoint light field displays based on the light field technologies need to process and transmit several to dozens of images at the same time. Therefore, how to reasonably use the rendering capability of the GPU/graphics card has become a requirement.

After research and analysis, it has been found that people are more sensitive to the clarity of a fixation region, and relatively less sensitive to a region other than the fixation region. Based on this principle, the electronic device may perform high-definition rendering only in the fixation region, thereby saving the rendering overhead and transmission bandwidth of the GPU/graphics card overall.

In view of this, the embodiments of the present disclosure provide an image processing method, which is applied to an electronic device having a display. The method may include as follows. The electronic device obtains pupil coordinates of a user, and determines a fixation region and a non-fixation region of the user on the display according to the pupil coordinates. The electronic device uses a high resolution to render an image of the fixation region, and uses a low resolution to render an image of the non-fixation region. That is, the electronic device may use different resolutions to render the same frame of image. Compared with a case where each frame of image is rendered with a high resolution, the rendering pressure of the GPU of the electronic device is reduced. In addition, the electronic device may further stitch an image of the fixation region after the rendering and an image of the non-fixation region after the rendering, and display a stitched image on the display. Since an image of the fixation region in the stitched image is a high-definition image, the requirements of the users for high-definition images is satisfied.

It should be noted that, in the embodiments of the present disclosure, the electronic device may be a television, a computer, etc. that has a display. The display of the electronic device may be capable of performing refreshing in different zones, and the refresh rate of each region may be different. For example, the display region of the display of the electronic device may be divided into a plurality of sub-regions, and each sub-region may display an image at a different refresh rate.

In a possible design, the electronic device may have multiple control components, and each control component corresponds to a sub-region. There is a driving circuit between each control component and each display pixel in the corresponding sub-region of the display region. In this way, each control component may control the output of the corresponding sub-region. That is, each control component may control the refresh rate and the resolution of the corresponding sub-region.

Implementation manners in embodiments of the present disclosure will be described in details below with reference to the accompanying drawings of the specification.

As shown in FIG. 1, FIG. 1 is a schematic diagram showing a structure of an electronic device provided in the embodiments of the present disclosure. The electronic device may include a display 110 and a processor 120. The display 110 may be communicatively connected to the processor 120. For example, the display 110 and the processor 120 may be connected through a system bus 130. Alternatively, the processor 120 may be embedded in the display 110.

The display 110 may be referred to as a display screen, a screen, etc. The display 110 may be used to display images. For example, the display may be a liquid crystal display (LCD), an organic light-emitting diode (OLED) display, etc.

The processor 120 may include one or more GPUs and one or more central processing units (CPUs). The GPU may be used to render images. The CPU may be used to analyze the images and execute operations of the electronic device in the embodiments of the present disclosure, for example, to stitch images and determine a fixation region of a user.

Figure 2:
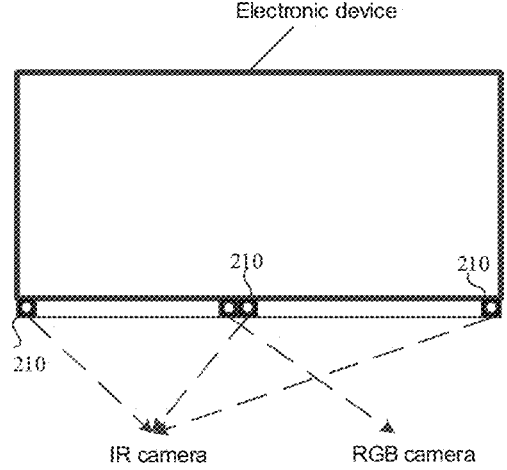
FIG. 2 is a schematic diagram showing a structure of another electronic device, in accordance with embodiments of the present disclosure.

In a possible implementation manner, as shown in FIG. 2, the electronic device may be provided with one or more cameras 210. The one or more cameras 210 may be arranged under the display of the electronic device. Certainly, the one or more cameras 210 may also be arranged in other places of the electronic device, for example, may be arranged on the top or side of the electronic device, which will not be limited. Alternatively, in order to capture face images of the user from a plurality of angles more accurately, each edge of the display of the electronic device may be provided with a camera 210. The one or more cameras 210 may be communicatively connected to the processor 120.

The one or more cameras 210 may be used to capture images of the user, and transmit the images of the user to the processor, so that the processor may recognize the images of the user to obtain pupil coordinates of the user.

For example, the one or more cameras 210 may include one or more red green blue (RGB) cameras and/or one or more infrared radiation (IR) cameras (only one RGB camera and three IR cameras are shown in the figure). The RGB camera(s) and the IR camera(s) may be used to acquire image information of the user. The image information of the user may include a face image and a pupil image of the user.

In an example, the electronic device may acquire the face image of the user through the RGB camera, and acquire the pupil image of the user through the IR camera. The RGB camera has a high refresh rate and a low resolution, and the IR camera has a high resolution. Therefore, the electronic device may perform face recognition on the image captured by the RGB camera, mark a human eye region, and determine coordinates of the human eye region. Then, the electronic device may mark a human eye region on the IR high-definition pupil image according to the coordinates of the human eye region, and perform pupil detection in the human eye region, thus determining pupil coordinates of the user. That is, the electronic device only needs to recognize the pupil in the pupil image captured by the IR camera and does not need to recognize the human eye region of the user again, thereby reducing the computational cost of the processor.

Further, in order to reduce the pressure on the IR camera(s), the electronic device may control the one or more IR cameras to cyclically and alternately acquire pupil images of the user.

In an example, the electronic device may be provided with a timing control module. The electronic device may output control information through the timing control module, and the control information may be used to control working frequencies of the one or more IR cameras. For example, the control information may include working time of each IR camera of the one or more IR cameras within a working cycle. For example, for three IR cameras, a total duration of a working cycle is 3 hours, and the control information may include IR1-1, IR2-2, and IR3-3. Here, "IR1", "IR2", and "IR3" are identifications of the IR cameras, "IR1-1" indicates that the IR1 camera works during the first hour, "IR2-2" indicates that the IR2 camera works during the second hour, "IR3-3" indicates that the IR3 camera works during the third hour. In this way, the three IR cameras may acquire images cyclically and alternately, thereby ensuring that the electronic device can continuously output pupil coordinates at equal time intervals.

It should be noted that when the electronic device is provided with a plurality of IR cameras, each IR camera may have a corresponding identification, and data of the pupil image captured by each IR camera may include the identification of the IR camera. The electronic device may determine the IR camera according to the corresponding identification of the IR camera.

In another example, the electronic device may also control the one or more IR cameras to capture the pupil images of the user synchronously. In this way, the electronic device may capture a plurality of frames of pupil images of the user at the same time, and determine pupil coordinates corresponding to each frame of pupil image. Furthermore, the electronic device may accurately determine the pupil coordinates of the user according to a plurality of pupil coordinates.

It should be noted that the pupil coordinates may be two-dimensional coordinates or three-dimensional coordinates. It may be related to the settings of the IR camera(s) and the RGB camera(s) of the electronic device. For example, when the IR camera and the RGB camera of the electronic device are capable of capturing three-dimensional images, the IR camera and the RGB camera may capture three-dimensional face images, and the pupil coordinates of the user determined by the electronic device may be three-dimensional coordinates. When the IR camera and the RGB camera of the electronic device are not capable of capturing three-dimensional images, the IR camera and the RGB camera may capture two-dimensional face images, and the pupil coordinates of the user determined by the electronic device may be two-dimensional coordinates.

Further, the positions of the IR camera and the RGB camera of the electronic device are fixed. After the electronic device recognizes the face image captured by the RGB camera and obtains the coordinates of the human eye region, and recognizes the pupil image captured by the IR camera and obtains the pupil coordinates, it may convert the coordinates of the human eye region into the pupil coordinates based on the relative distance between the IR camera and the RGB camera.

In yet another example, the electronic device may be provided with a human eye tracking module. The human eye tracking module may track the movement of human eyes in real time. The human eye tracking module may determine the pupil coordinates of the user based on the human eye tracking algorithm. In this way, the electronic device may determine the pupil coordinates more accurately without performing face recognition on multiple images.

In yet another example, the electronic device may further be provided with an infrared detection module. The infrared detection module may be used to detect whether the user is present. If the electronic device detects that no user is watching the display during the use of the electronic device or the electronic device cannot detect the pupil coordinates of the user, the electronic device may refresh each frame of image with low resolution and low refresh rate. When the electronic device uses the infrared detection module to detect that the user is located within a preset range or a distance between the user and the electronic device is less than a preset distance, the electronic device may control the IR camera and the RGB camera to acquire the pupil coordinates of the user, and then determine the fixation region of the user, and render an image corresponding to the fixation region with high resolution and high refresh rate.

In another example, the electronic device may further be provided with a graphics card status monitoring module. The graphics card status monitoring module may be used to monitor the temperature and resource usage rate of the graphics card. When the temperature of the graphics card exceeds a preset temperature and/or the resource usage rate exceeds a preset threshold, the electronic device may prompt the user to turn off the display, or may refresh each frame of image with low resolution and low refresh rate. In this way, the safety of the graphics card may be improved.

Figure 3:
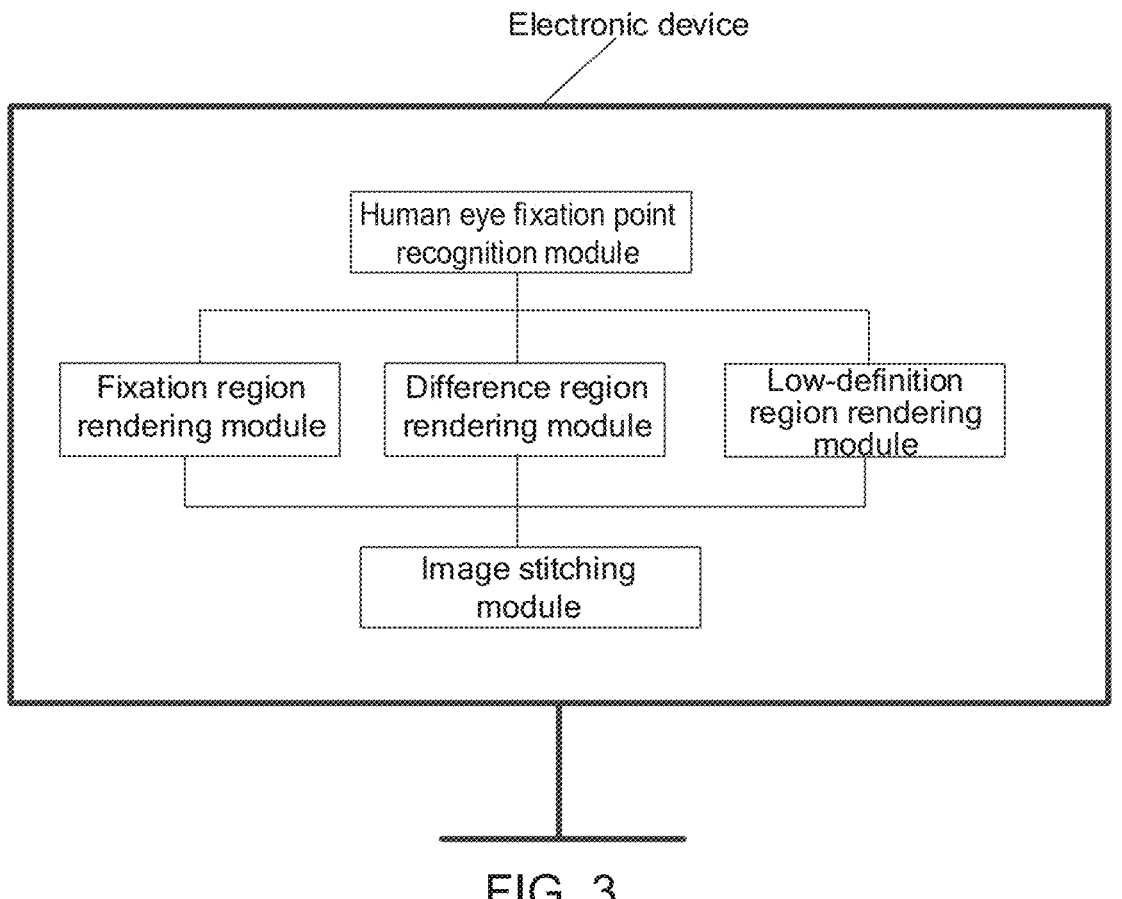
FIG. 3 is a schematic diagram showing a structure of yet another electronic device, in accordance with embodiments of the present disclosure.

In a possible implementation manner, as shown in FIG. 3, the electronic device provided in the embodiments of the present disclosure may further include a human eye fixation point recognition module, a fixation region rendering module, a difference region rendering module, a low-definition region rendering module, and an image stitching module.

The human eye fixation point recognition module may be used to determine a fixation region and a non-fixation region of the user on the display 110 according to the pupil coordinates of the user. As for a specific method of determining the fixation region and the non-fixation region, reference may be made to the following description, which will not be provided here.

The fixation region rendering module may be used to render an image corresponding to the fixation region. The differential region rendering module is used to render an image corresponding to the differential region. The low-definition region rendering module is used to render an image corresponding to the low-definition region. The image stitching module may be used to stitch images corresponding to all regions to obtain a stitched image. As for the specific splicing method, reference may be made to the following description, which will not be provided here.

Further, in order to render the image more accurately, the non-fixation region may be divided into a difference region (also called a differential region) and a low-definition region. That is, the images may include the image corresponding to the fixation region, the image corresponding to the difference region, and the image corresponding to the low-definition region. As for the method of determining the image corresponding to each region, reference may be made to the following description, which will not be provided here.

The fixation region may refer to a region that the user mainly views at a certain moment, or may refer to a region where the pupils of the user are fixed at a certain moment. The difference region may refer to a region other than an overlapping region in a fixation region at a previous moment of the current moment. The overlapping region may refer to an overlapping region of the fixation region at the current moment and the fixation region at the previous moment. The low-definition region may refer to a remaining region in a display region of the display other than fixation regions at two consecutive moments.

Figure 4:
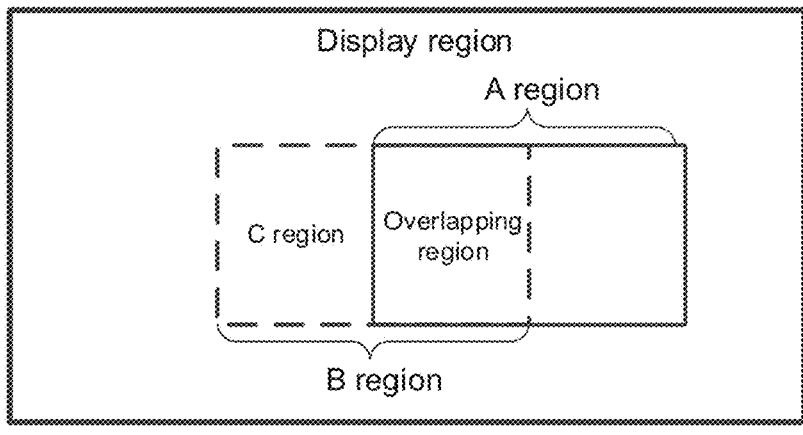
FIG. 4 is a schematic diagram showing a fixation region and a non-fixation region of a display, in accordance with embodiments of the present disclosure.

For example, in a and b of FIG. 4, the A region (the region composed of solid lines) may refer to the fixation region at the current moment, and the B region may refer to a fixation region at a first moment (the region composed of dotted lines). The first moment is a previous moment of the current moment. That is, the fixation region of the user moves from the B region to the A region. The C region (that is, the region in the B region other than the overlapping region of the A region and the B region) is the differential region. In a and b of FIG. 4, the region other than the A region and the B region in the display region of the electronic device may be the low-definition region.

As another example, as shown in c of FIG. 4, when the A region and the B region have no overlapping region, the B region may be either the fixation region at the previous moment or the difference region. In c of FIG. 4, a region other than the A region and the B region may be the low-definition region.

After introducing the concepts of the fixation region, the difference region, and the low-definition region, the methods of determining the fixation region, the difference region, and the low-definition region will be described below.

1. The Method of Determining the Fixation Region.

In a possible implementation manner, the electronic device may determine screen coordinates corresponding to the pupil coordinates on the display according to the pupil coordinates and a preset screen coordinate determination model. Then, the electronic device determines the fixation region of the display at the current moment according to the size of the fixation region and the screen coordinates.

The preset screen coordinate determination model may be used to determine the screen coordinates corresponding to the pupil coordinates on the display. The preset screen coordinate determination model may be pre-configured in the electronic device, or may be obtained by the electronic device through training according to a preset algorithm, a plurality of pupil coordinates and corresponding screen coordinates. The input of the preset screen coordinate determination model is the pupil coordinates of the user, and the output is the screen coordinates. The screen coordinates may also be referred to as fixation point coordinates.

In an example, when the electronic device is initially started, the electronic device may display a plurality of calibration points on the display, and prompt the user to gaze at each calibration point in sequence. For example, when the electronic device is initially started, before displaying content, the electronic device may display calibration points in the upper left corner, lower right corner, lower left corner, and upper right corner of the display in sequence, and output prompt information to prompt the user to gaze at the calibration points. Meanwhile, the electronic device may sequentially acquire the pupil image when the user gazes at each calibration point, and determine the corresponding pupil coordinates. In this way, the electronic device may acquire coordinates of a plurality of calibration points and corresponding pupil coordinates. Moreover, the electronic device may use the plurality of calibration points and the corresponding pupil coordinates as sample data, and use the preset algorithm to train the sample data to obtain the preset screen coordinate determination model. For example, the preset algorithm may be a neural network algorithm, such as a deep convolutional neural network algorithm.

Furthermore, in order to verify the accuracy of the preset screen coordinate determination model, the electronic device may continue to acquire a plurality of calibration points and corresponding pupil coordinates of the user. The electronic device may use coordinates of the plurality of calibration points and the corresponding pupil coordinates as test samples to test the preset screen coordinate determination model. If the errors between the screen coordinates output by the preset screen coordinate determination model and the coordinates of the calibration points are within a preset range, it means that the preset screen coordinate determination model has high accuracy. If the errors exceed the preset range, the preset screen coordinate determination model may continue to be trained.

Of course, the electronic device may also fit the plurality of calibration points and the corresponding pupil coordinates to obtain a linear relationship between the calibration points and the pupil coordinates. Based on the linear relationship, the electronic device may determine the screen coordinates (calibration point coordinates) corresponding to the pupil coordinates of the user.

In order to verify the accuracy of the linear relationship, the electronic device may randomly display a plurality of calibration points on the display, and obtain pupil coordinates corresponding to each calibration point. Then, the electronic device may verify the accuracy of the linear relationship according to coordinates of the plurality of calibration points and corresponding pupil coordinates. If it is determined that difference values between the coordinates of the calibration points and calibration points corresponding to the pupil coordinates are within a preset range, it means that the linear relationship has high accuracy. If the difference values exceed the preset range, it means that the error of the linear relationship is high, and the electronic device may perform refitting according to the coordinates of the plurality of calibration points and the corresponding pupil coordinates to obtain a new linear relationship.

It should be noted that, in the embodiments of the present disclosure, the electronic device may determine a ratio between the fixation region and the display region of the display. Then, the electronic device may determine the size of the fixation region according to the product of the ratio and the display region.

In an example, the ratio between the fixation region and the display region of the display satisfies a preset formula. For example, the preset formula may be the following Formula one.

$$X + X \times N + (1 - 2X) \times M \times N = K \qquad \text{Formula one}$$

Here, X represents the ratio between the fixation region and the display region of the display; N represents a compression ratio of the image corresponding to the non-fixation region; M represents a refresh ratio of each frame of image corresponding to the non-fixation region; and K represents a ratio between the actual resolution of the display and the rated resolution of the display.

The compression ratio N of the image may refer to a ratio between the number of pixels that are actually displayed and the number of pixels that can be displayed of each sub-region of the display. For example, the compression ratio of the image of 1/4 means that the number of pixels that are actually displayed in each sub-region is 1/4 of the number of pixels that can be displayed in the sub-region. For example, if the number of pixels that can be displayed in each sub-region is 240, then the number of pixels that are actually displayed in each sub-region after compression is 60.

For example, the display of the electronic device may include 288 (i.e., 32×9) sub-regions, and the sub-regions are arranged in sequence. Each sub-region has a corresponding tag (e.g., a serial number). For example, the tags of the 288 sub-regions are 1 to 288, respectively. The total bandwidth of the image transmission of the electronic device is expressed as 7680×2160@120 Hz. "7680×2160" represents the rated resolution of the electronic device, and 120 Hz is the refresh rate of the electronic device. The number of pixels that can be displayed in each sub-region of the display is 240 (i.e., 7680/32).

Figure 5:
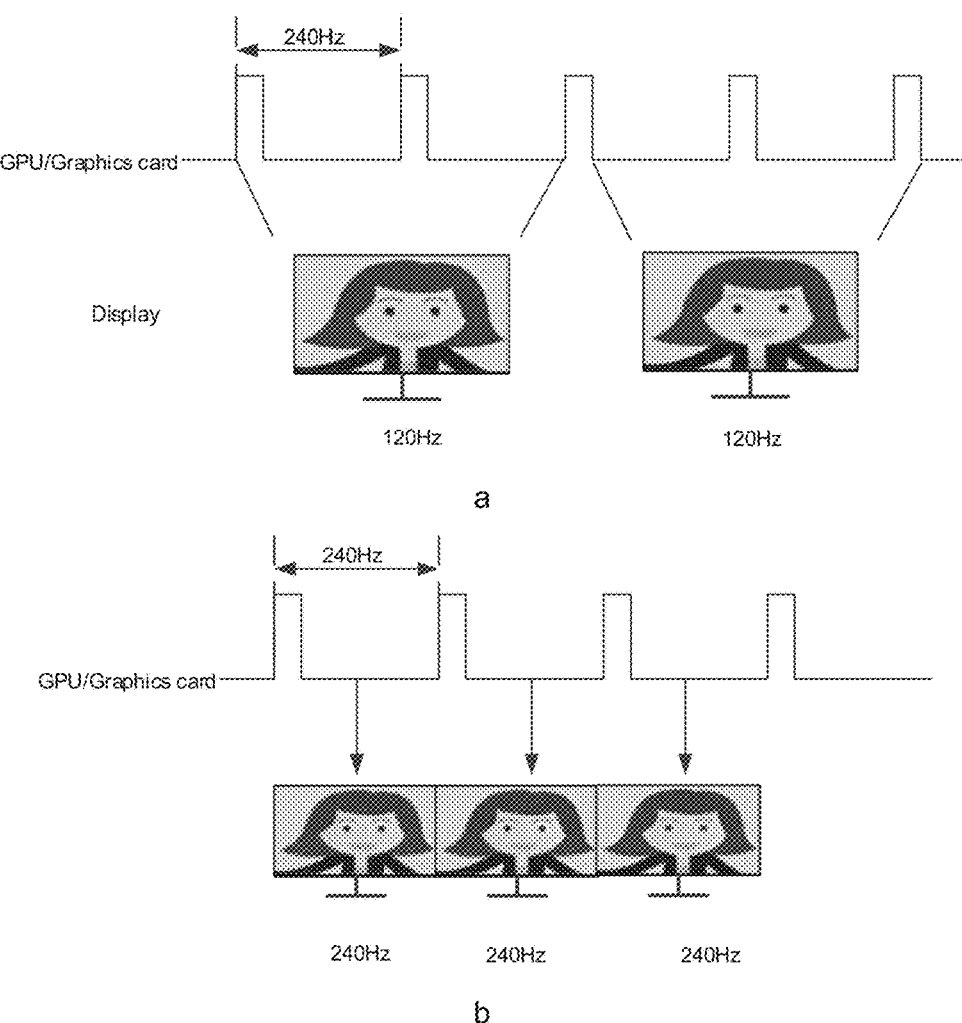
FIG. 5 is a schematic diagram showing different refresh rates of an electronic device, in accordance with embodiments of the present disclosure.

For example, as shown in a of FIG. 5, when the refresh rate of the electronic device is 120 Hz, the electronic device may refresh the image once every two refresh cycles. As shown in b of FIG. 5, when the refresh rate of the electronic device is 240 Hz, the electronic device may refresh the image once every refresh cycle.

It should be noted that the 240 Hz of the GPU/graphics card in a of FIG. 5 means that the refresh rate of the display is 240 Hz, and the 120 Hz of the image corresponding to the display means that the refresh rate of the display for refreshing images is 120 Hz. That is, the electronic device may refresh one frame of image within two refresh cycles. The 240 Hz of the GPU/graphics card in b of FIG. 5 means that the refresh rate of the display is 240 Hz, and the 240 Hz of the image corresponding to the display means that the refresh rate of the display for refreshing images is 240 Hz. That is, the electronic device may refresh one frame of image within each refresh cycle.

It can be seen from the descriptions of a and b in FIG. 5 that, in the embodiments of the present disclosure, by increasing the refresh rate of the electronic device, the rate of the display for refreshing images may be increased. Compared with a case where the electronic device uses a low refresh rate to refresh images, the latency of the display may be reduced.

The refresh ratio M of each frame of image corresponding to the non-fixation region may refer to a ratio of a region of each refresh to a total region of the image corresponding to the non-fixation region. For example, if 1/3 of the image corresponding to the non-fixation region is refreshed at a certain moment, the refresh ratio of the image corresponding to the non-fixation region at this moment is 1/3. In this way, it takes 3 consecutive refreshes to completely update the image of the entire non-fixation region.

Figure 6:
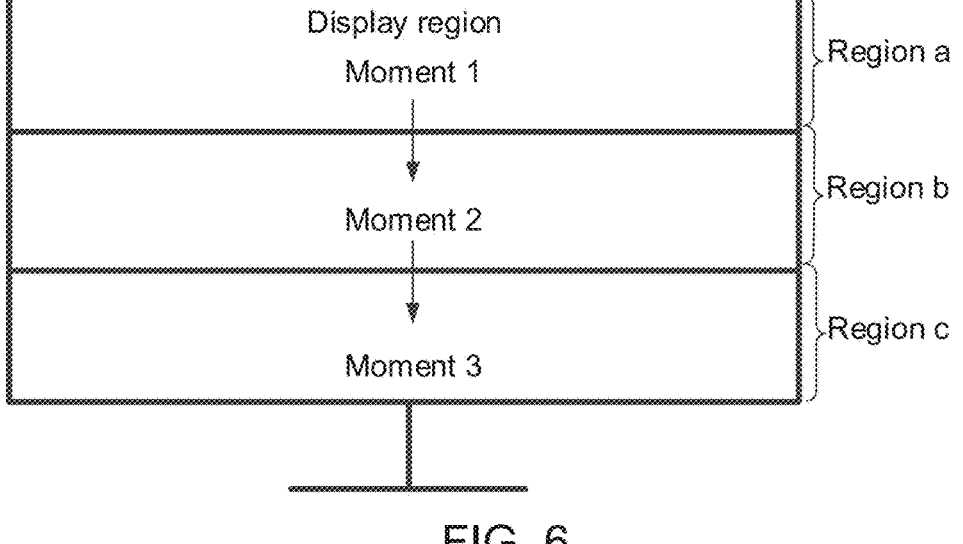
FIG. 6 is a schematic diagram showing a refresh method of an electronic device for a low-definition region, in accordance with embodiments of the present disclosure.

The refresh ratio of the image corresponding to the non-fixation region being 1/3 means that the electronic device refreshes 1/3 of the image corresponding to the non-fixation region each time. For example, as shown in FIG. 6, the electronic device refreshes an image of the region a of the non-fixation region at the moment 1, refreshes an image of the region b of the non-fixation region at the moment 2, and refreshes an image of the region c of the non-fixation region at the moment 3. Here, the moment 1, the moment 2, and the moment 3 are three consecutive moments. The moment 1 is the previous moment of the moment 2, and the moment 2 is the previous moment of the moment 3. The sizes of the region a, the region b and region c may be the same or different, but the sum of the areas of the three regions is the entire non-fixation region.

It should be noted that, for the image corresponding to the non-fixation region, only 1/3 of the image is refreshed during each refresh of the non-fixation region. Therefore, the rendering amount of the GPU may be reduced.

Further, after determining the ratio between the fixation region and the display region of the display, the electronic device may determine the size of the display region according to the size of the display region of the display and the ratio, and determine the screen coordinates corresponding to the pupil coordinates as center coordinates of the display region.

In an example, in order to make the refresh rate of the electronic device 240 Hz, the amount of the image may be reduced by half, that is, the actual resolution of the display is set to 3840×2160, that is, K=1/2. Considering an example in which the refresh rate of the non-fixation region is 1/3 and the compression ratio of the image corresponding to the non-fixation region is 1/4, in combination with the above Formula one, the ratio between the fixation region and the display region of the display may be determined as 5/13. In combination with the above description that the display includes 288 sub-regions, the size of the fixation region is 288 by 5/13, which is approximately equal to 110.7. Theoretically, the fixation region may include 100 (i.e., 10×10) sub-regions. However, the display has a total of 9 zones in a vertical direction, so the fixation region may be set to 108 (i.e., 12×9) sub-regions. In this way, the electronic device may use the screen coordinates corresponding to the pupil coordinates as the center and 108 sub-regions as the size for expansion to obtain the fixation region. For example, as shown in a in FIG. 7, the point d is the screen coordinates corresponding to the pupil coordinates, and the fixation region is the D1 region. The D1 region includes 108 sub-regions.

It should be noted that, in the embodiments of the present disclosure, the shape of the fixation region is rectangular. When the electronic device performs expansion using the screen coordinates corresponding to the pupil coordinates as the center, if the expanded region is beyond the display, then the border of the display is used as the border of the fixation region. For example, as shown in b in FIG. 7, when the fixation region determined by the electronic device includes 108 sub-regions, the point d is the screen coordinates corresponding to the pupil coordinates; the region D2 is the fixation region determined by the electronic device, and the left border of the region D2 is beyond the display region of the display; therefore, the electronic device may use the region D3 (including 90 sub-regions) as the fixation region.

In yet another possible implementation manner, in order to reduce the pressure on the processor of the electronic device, the size of the fixation region of the electronic device may be preset. For example, when the display includes 32×9 sub-regions, the fixation region may include 81 (i.e., 9×9) sub-regions. In combination with the fixation region shown in a of FIG. 7, after determining the screen coordinates d corresponding to the pupil coordinates of the user, the electronic device may use the screen coordinates d as the center, and use a fixation region with a size equal to the sum of the sizes of the 81 sub-regions as the fixation region. In this way, the electronic device only needs to determine the pupil coordinates of the electronic device at each moment, and then directly determine the fixation region of the user according to the size of the preset fixation region.

2. The Method of Determining the Difference Region.

In a possible implementation manner, the electronic device may perform Boolean operation on fixation regions at two consecutive moments to determine the difference region.

In an example, the electronic device may be provided with a memory (or a buffer), and the electronic device may store information of fixation regions at multiple consecutive moments. For example, coordinates of the fixation regions may be stored. After determining the fixation region of the user at the current moment, the electronic device may compare the fixation region at the current moment with the stored coordinates of the fixation region of the user at the previous moment to determine the difference region.

For example, if coordinates of the lower left corner of the fixation region at the current moment are located on the border of the fixation region at the previous moment, the difference region may be the C region in a of FIG. 4.

As another example, if the coordinates of the lower left corner of the fixation region at the current moment are located within the fixation region at the previous moment, the difference region may be the C region in b of FIG. 4.

As another example, if the coordinates of the lower left corner of the fixation region at the current moment are located outside the fixation region at the previous moment, the difference region may be the B region in c of FIG. 4.

3. The Method of Determining the Low-Definition Region.

In a possible implementation manner, after determining the fixation region and the difference region, the electronic device may determine the low-definition region according to difference values between the display region, and the fixation region and the difference region.

For example, the electronic device may determine tags of a plurality of sub-regions included in the low-definition region according to the stored tags of all the sub-regions of the display region, stored tags of a plurality of sub-regions included in the fixation region and stored tags of a plurality of sub-regions included in the differential region. Furthermore, the electronic device may determine the low-definition region of the display according to the tags of the plurality of sub-regions included in the low-definition region.

In yet another possible implementation manner, in order to reduce the computational cost, the electronic device may use the entire display region as the low-definition region.

It should be noted that, in the embodiments of the present disclosure, when the electronic device renders images in the same region by using high resolution and high refresh rate and using low resolution and low refresh rate, the rendered images have high resolution and high refresh rate. That is, the high-definition image may cover the low-definition image; or the high-definition image may be superimposed on the low-definition image, and the superimposed image is a high-definition image. Therefore, the electronic device performs rendering by using the entire display region as the low-definition region, which may still make the fixation region display a high-definition image without affecting the user's experience, thereby satisfying the user's requirements for high-definition content.

After the descriptions of the methods of determining the fixation region, the difference region, and the low-definition region provided in the embodiments of the present disclosure, the methods of determining the image corresponding to the fixation region, the image corresponding to the difference region, and the image corresponding to the low-definition region provided in the embodiments of the present disclosure will be described below.

In a possible embodiment, the electronic device may determine a corresponding projection matrix according to the location information of each region, and determine an image corresponding to a region to be rendered according to the projection matrix.

The projection matrix may be used to determine the image corresponding to the region to be rendered. The rendering region may include a fixation region, a difference region, and a low-definition region.

For example, the electronic device may have a virtual camera. For example, the virtual camera may be a software program of the electronic device. The virtual camera may be a set of data parameters of the electronic device. These data parameters may be used to identify the position, orientation, viewing angle, etc. of the rendered image. The size of the viewport the virtual camera may be adjusted according to a projection matrix. For example, when the projection matrix is the projection matrix corresponding to the fixation region, the electronic device may adjust the viewport of the virtual camera according to the projection matrix, so that the adjusted viewport of the virtual camera may capture the image corresponding to the fixation region (the shape of the image captured by the viewport of the virtual camera is rectangular). The electronic device may determine the image corresponding to the fixation region according to the viewport of the virtual camera, and render the image to obtain the rendered image of the fixation region.

In an example, the projection matrix (camera projection matrix) of the fixation region may be obtained according to a preset projection matrix of the virtual camera and one or more matrices. The preset projection matrix may be preset in the electronic device. For example, each component in the preset projection matrix is related to data parameters of the virtual camera. The one or more matrices may be determined according to position information of the rendering region. The one or more matrices and the preset projection matrix have the same order. For example, the one or more matrices and the preset projection matrix may all be 4×4 matrices.

For example, the preset projection matrix m1 of the electronic device is equal to $$
\begin{vmatrix}
\dfrac{\cot\left(fovy/2\right)}{waspect} & 0 & 0 & 0 \\
0 & \cot\left(fovy/2\right) & 0 & 0 \\
0 & 0 & -\dfrac{f+n}{f-n} & -\dfrac{2fn}{f-n} \\
0 & 0 & -1 & 0
\end{vmatrix}.
$$

Here, fovy may represent a vertical angle of a viewing frustum of the virtual camera, "aspect" represents an aspect ratio of the virtual camera, f represents a far plane distance of the virtual camera, and n represents a near plane distance of the virtual camera. These parameters of the virtual camera may be set according to needs. For example, fov=60, n=0.1, f=1000, aspect=1.775, which will not be limited.

The position information r of the rendering region is expressed as r=Rect(x, y, w, h). Here, (x, y) may be coordinates of the rendering region (for example, it may be the coordinates of the lower left corner, the coordinates of the lower right corner, etc.); w may be a width of the rendering region (it may also be a sum of widths of the plurality of sub-regions included in the rendering region); and h may be a height of the rendering region (it may also be a sum of heights of the plurality of sub-regions included in the rendering region). Then, the one or more matrices may be m2 and m3 as described below.

For example, the matrices are matrices of order 4 by 4, $$
m2 = \begin{vmatrix}
\dfrac{1}{w} & 0 & 0 & \dfrac{1}{w}-1 \\
0 & \dfrac{1}{h} & 0 & \dfrac{1}{h}-1 \\
0 & 0 & 1 & 0 \\
0 & 0 & 0 & 1
\end{vmatrix}, \text{ and } m3 = \begin{vmatrix}
1 & 0 & 0 & -x\times\dfrac{2}{w} \\
0 & 1 & 0 & -y\times\dfrac{2}{h} \\
0 & 0 & 1 & 0 \\
0 & 0 & 0 & 1
\end{vmatrix}.
$$

Then, the projection matrix M corresponding to the rendering region is expressed as M=m3×m2×m1.

Further, in order to simplify the computational cost of determining the image corresponding to the rendering region, it may be possible to perform normalization processing on the parameters in the position information of the rendering region. That is, the normalization processing is performed on x, y, w, and h in the above m2 and m3.

It should be noted that the above matrix is described by taking a matrix of order 4 by 4 as an example, and the projection matrix of the virtual camera may also be a matrix of other orders, such as a matrix of order 3 by 3, which will not be limited. Correspondingly, the order of the matrix constructed by the position information of the rendering region is consistent with the order of the projection matrix.

In an example, when the rendering region is the fixation region, the electronic device may determine the image corresponding to the fixation region according to the matrix constructed by the coordinates of the lower left corner, height, and width of the fixation region and the preset projection matrix, and then the electronic device may render the image corresponding to the fixation region to obtain the rendered image of the fixation region.

In another example, when the rendering region is the difference region, and the difference region is the difference region (the C region or the A region) shown in a or c of FIG. 4, since the shape of the difference region is rectangular, the electronic device may determine the projection matrix corresponding to the difference region according to a product of the matrix that is constructed by the coordinates of the lower left corner, height, and width of the difference region and the preset projection matrix, and determine the image corresponding to the difference region according to the projection matrix corresponding to the difference region, and then the electronic device may render the image corresponding to the difference region to obtain the rendered image of the difference region.

In yet another example, when the rendering region is the difference region, and the difference region is the difference region (the C region) shown in b of FIG. 4, since the shape of the difference region is irregular, the electronic device may divide the difference region into a plurality of rectangles.

For example, as shown in a and b of FIG. 8, the electronic device may divide the differential region (the C region) into the C1 region and the C2 region. In this way, the electronic device may respectively determine projection matrices corresponding to the C1 region and the C2 region, and determine an image corresponding to each region according to the projection matrices corresponding to the C1 region and the C2 region. Furthermore, the electronic device may render the image corresponding to the C1 region and render the image corresponding to the C2 region, so as to obtain the rendered image corresponding to the difference region.

As another example, as shown in c of FIG. 8, the electronic device may divide the difference region (the C region) into the C1 region, the C2 region, and the C3 region. In this way, the electronic device may respectively determine the projection matrices corresponding to the C1 region, the C2 region, and the C3 region, and determine the images corresponding to each region according to the projection matrices corresponding to the C1 region, the C2 region, and the C3 region. Furthermore, the electronic device may render the image corresponding to the C1 region, render the image corresponding to the C2 region, and render the image corresponding to the C3 region, so as to obtain an image corresponding to the difference region after the rendering.

In yet another example, when the rendering region is the low-definition region, since the low-definition region has an irregular shape, the electronic device may divide the low-definition region into a plurality of rectangles. For example, in combination with a of FIG. 4, as shown in FIG. 9, the electronic device may divide the low-definition region into a plurality of rectangular regions (e.g., regions D1 to D4). In this way, the electronic device may determine a projection matrix corresponding to each rectangular region, and then may determine the image corresponding to the low-definition region.

Further, in order to reduce the computational cost of the electronic device, the electronic device may use the entire display region as the low-definition region, and render the low-definition region using low resolution and low refresh rate. For example, the electronic device may use the low-definition region corresponding to the moment 1 as a complete rendering region. In this way, the electronic device may determine the projection matrix of the low-definition region corresponding to the moment 1, and then determine the image corresponding to the low-definition region, and perform low-definition rendering on the image corresponding to the low-definition region to obtain the rendered image.

After the descriptions of the methods of determining the fixation region and the non-fixation region (including the difference region and the low-definition region) and the description of the method of determining the image corresponding to each region, in combination with the electronic device as shown in FIG. 1, the image processing method provided in the embodiments of the present disclosure will be described below.

As shown in FIG. 10, the embodiments of the present disclosure provide the image processing method. The method may be used in the electronic device as shown in FIG. 1, or may be used in the processor of the electronic device. The method may include S1001 to S1003.

In S1001, the pupil coordinates of the user at the current moment are obtained, and the fixation region and the non-fixation region of the display at the current moment according to the pupil coordinates of the user are determined.

As for this step, reference may be made to the above method of determining the fixation region, and details are not repeated here.

In S1002, the image corresponding to the fixation region is rendered according to a first resolution, and the image corresponding to the non-fixation region is rendered according to a second resolution.

The first resolution is greater than the second resolution. The first resolution and the second resolution may be set according to needs. For example, the first resolution may be 7680×2160, and the second resolution may be 3840×1080, which will not be limited.

In a possible implementation manner, the electronic device may be preset with a plurality of different resolutions. In this way, the electronic device may select, according to a preset instruction, the first resolution from the plurality of different resolutions to render the image corresponding to the fixation region, and select, according to the preset instruction, the second resolution from the plurality of different resolutions to render the image of the non-fixation region, so that the image corresponding to the fixation region after the rendering and the image corresponding to the non-fixation region after the rendering are obtained.

In S1003, the image corresponding to the fixation region after the rendering and the image corresponding to the non-fixation region after the rendering are stitched, and the stitched image is displayed on the display.

The electronic device may stitch, according to a preset format, the image corresponding to the fixation region after the rendering and the image corresponding to the non-fixation region after the rendering, so as to obtain the stitched image. Then, the electronic device may display the stitched image on the display. The fixation region of the stitched image is high-definition content, which satisfies the requirements of the user. In addition, the non-fixation region of the stitched image is low-definition content, which reduces the rendering amount of the GPU.

In a possible implementation manner, the electronic device may package the data and position information of the image corresponding to the fixation region after the rendering and the data and position information of the image corresponding to the non-fixation region after the rendering into data of the preset format, and transmit the data to the display, so that the display analyzes the packaged data to obtain an image corresponding to each sub-region.

Position information of an image is used to indicate a position of the image in a corresponding display region and a scaling ratio (also called a compression ratio). The position information of the image may include tags of a plurality of sub-regions of the display region corresponding to the image. The scaling ratio of the image may refer to a ratio between a compressed size and an actual size of the image.

In this way, the electronic device may reduce the data transmission amount of the transmission bandwidth by compressing the image.

Figure 11:
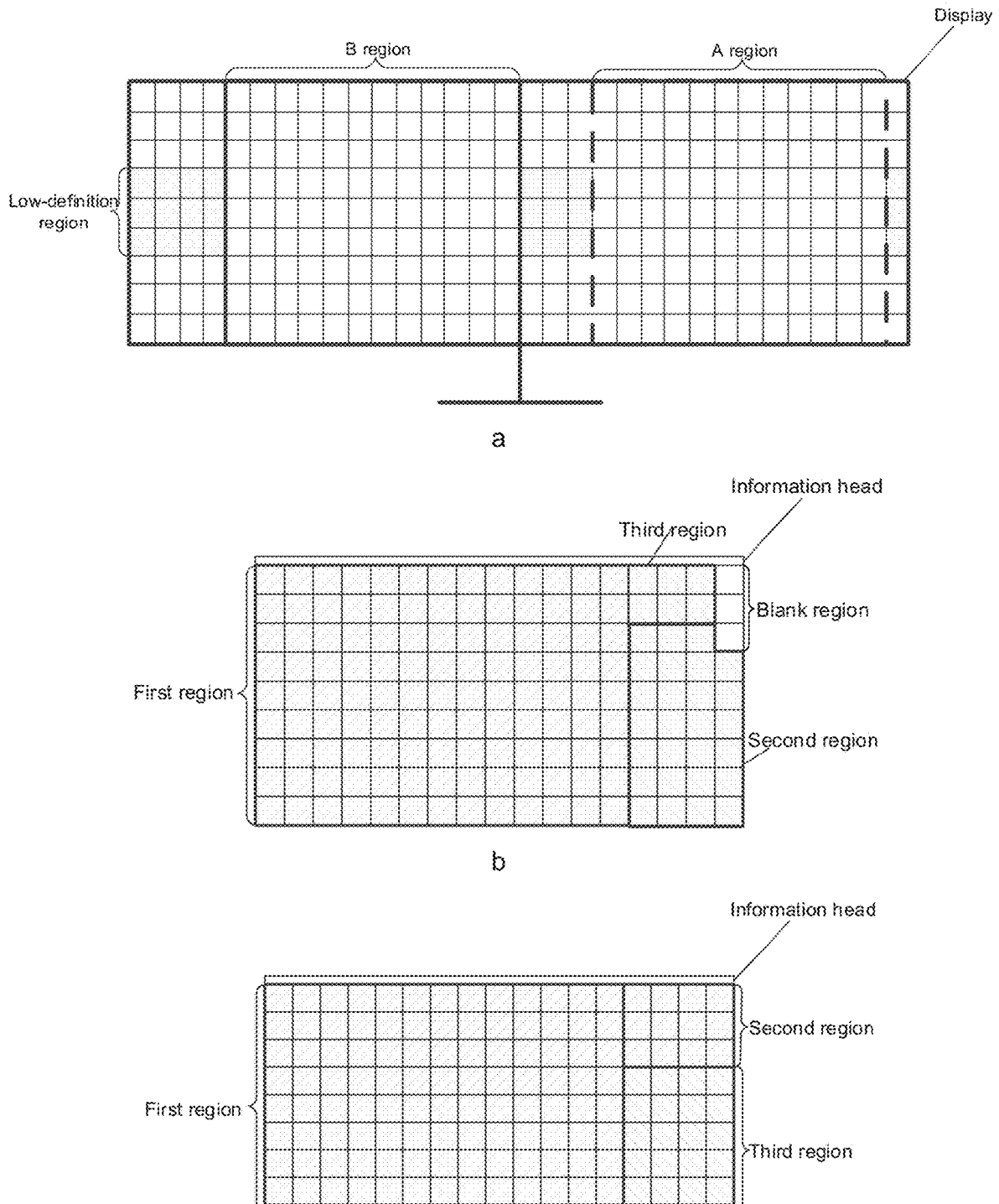
FIG. 11 is a schematic diagram of an image stitching, in accordance with embodiments of the present disclosure.

In an example, position information of the images corresponding to the regions after the rendering may be shown in a of FIG. 11. In a of FIG. 11, the fixation region at the current moment (the A region) does not overlap with the fixation region at the first moment (the B region). That is, the fixation region at the first moment is also the difference region. The low-definition region may be a region that is one-third of the entire display region, or may be a part of the region that does not overlap with the fixation region.

For example, the electronic device may stitch the image corresponding to the fixation region and the image corresponding to the non-fixation region at the current moment into a format as shown in b of FIG. 11. In b of FIG. 11, each sub-region is provided with image information. For example, the first region may be provided with the image information corresponding to the fixation region, and the second region may be provided with the image information corresponding to the difference region. The third region may be provided with the image information corresponding to the low-definition region.

It should be noted that, for the format shown in b of FIG. 11, the image of the fixation region is an image with high resolution and high refresh rate. Therefore, image information of a single sub-region in the first region may include image data of a sub-region of the fixation region in a of FIG. 11 and a tag of the sub-region.

Since the image of the difference region is an image with low resolution and high refresh rate, the electronic device may set information of the compressed image of the difference region in a of FIG. 11 in the second region.

Image information of a single sub-region in the second region may include image information corresponding to the plurality of sub-regions of the difference region. For example, the number of sub-regions (a total of 108 sub-regions) and position occupied by the image of the difference region in the display region are shown in a of FIG. 11. The electronic device compresses the image of the difference region according to a compression ratio of 1/4, and the compressed image of the difference region corresponds to 27 sub-regions in b of FIG. 11. That is, image information of a single sub-region of the second region in b of FIG. 11 may include image data of 4 sub-regions of the difference region in a of FIG. 11 and tags of the 4 sub-regions.

Since the image of the low-definition region is an image with low resolution and high refresh rate, the electronic device may compress the image of the low-definition region and set it in the third region.

Image information of a single sub-region in the third region may include image information corresponding to the plurality of sub-regions of the low-definition region. For example, the number and positions of sub-regions (a total of 24 sub-regions) occupied by the image of the low-definition region in the display region are shown in a of FIG. 11. The electronic device compresses the image of the low-definition region at a compression ratio of 1/4, and the compressed image of the difference region corresponds to 6 sub-regions in b of FIG. 11. That is, image information of a single sub-region of the third region in b of FIG. 11 may include image data of 4 sub-regions of the low-definition region in a of FIG. 11 and tags of the 4 sub-regions.

It should be noted that, from the above description of the method of determining the fixation region, it can be known that the fixation region at the current moment determined by the electronic device includes 110.7 sub-regions. For convenience of calculation, the number of the sub-regions of the fixation region are adjusted to 108. Therefore, the blank region in b of FIG. 11 may be used for setting of data of images of the remaining sub-regions.

In another possible implementation manner, of course, in order to facilitate the stitching, the electronic device may stitch the images corresponding to the regions in a of FIG. 11 according to the format shown in c of FIG. 11. The image in c in FIG. 11 may further have an information header. The information header may be used to indicate a corresponding sub-region and a scaling ratio when each sub-region in c of FIG. 11 is displayed on the display. For example, in c of FIG. 11, the information header of the first region may include a corresponding serial number of a sub-region in the first region and the scaling ratio of 1 when the sub-region in the first region is displayed on the display. The information header of the second region may include corresponding serial numbers of sub-regions and the scaling ratio of 1/4 when a sub-region in the second region and a sub-region in the third region are displayed on the display.

Further, the processor of the electronic device may transmit the information of the images shown in b or c of FIG. 11 to the display through the transmission bandwidth according to a row-by-row transmission manner. After receiving the information of the images from the processor, the display may analyze the data of the image corresponding to the fixation region and the data of the image corresponding to the non-fixation region, and display the images in corresponding regions.

Based on the technical solution provided by this embodiment, after the electronic device obtains the pupil coordinates of the user, the fixation region and the non-fixation region of the user on the display may be determined according to the pupil coordinates. Furthermore, the electronic device may use a high resolution to render the image of the fixation region, and use a low resolution to render the image of the non-fixation region. That is, the electronic device may use different resolutions to render the same frame of image. Compared with a case of rendering the entire image with a high resolution, the rendering pressure of the GPU of the electronic device is reduced. In addition, the electronic device may further stitch the image of the fixation region after the rendering and the image of the non-fixation region after the rendering, and display the stitched image on the display. The image of the fixation region in the stitched image is a high-definition image, which satisfies the requirements of the user for high-definition images.

In a possible embodiment, as shown in FIG. 12, the method provided in the embodiments of the present disclosure may further include as follows.

In S1201, the image corresponding to the fixation region and the image corresponding to the difference region at the current moment are rendered according to a first refresh rate, and the image corresponding to the low-definition region is rendered according to a second refresh rate.

The first refresh rate is greater than the second refresh rate. As for the difference region and the low-definition region, reference may be made to the above description of FIG. 4, and details are not repeated here.

Based on this possible embodiment, the electronic device uses a high refresh rate to render the image of the fixation region and the image of the difference region at the current moment. Since the image displayed in the difference region is a high-definition image at the previous moment of the current moment, the image of the difference region may be rendered by using a high refresh rate and low resolution. Therefore, the rendering pressure of the GPU is reduced; and a high refresh rate may be used to refresh the image of the difference region and the image of the fixation region, which avoids the problem of image sticking caused by the image in the difference region and the image in the fixation region being out of sync. At the same time, the electronic device may use a low refresh rate to render the image in the low-definition region, which further reduces the processing pressure of the GPU.

It should be pointed out that the embodiments of the present disclosure may refer to each other, for example, the same or similar steps, method embodiments, system embodiments and device embodiments may refer to each other, which will not be limited.

In the embodiments of the present disclosure, an image processing device may be divided into functional modules or functional units according to the foregoing methods and examples. For example, the terminal may be divided in a way that each functional module or functional unit corresponds to a function, or that two or more functions are integrated into one processing module. The integrated module may be implemented in a form of hardware or in a form of software functional module or functional unit. The division of modules or units in the embodiments of the present disclosure is schematic, and is only a division according to logical functions, and there may be other division manners in actual implementation.

As shown in FIG. 13, it is a schematic structural diagram of an image processing device provided in the embodiments of the present disclosure. The image processing device is applied to an electronic device with a display. The device includes an obtaining unit 1301, a processing unit 1302 and a stitching unit 1303.

The obtaining unit 1301 is configured to obtain the pupil coordinates of the user at the current moment. For example, the obtaining unit 1301 may be used to perform S1001 in FIG. 10. The processing unit 1302 is configured to: determine the fixation region and non-fixation region corresponding to the display at the current moment according to the pupil coordinates of the user, render the image corresponding to the fixation region according to a first resolution, and render the image corresponding to the non-fixation region according to a second resolution. The first resolution is greater than the second resolution. For example, the processing unit 1302 may be used to perform S1002 in FIGS. 10 and S1201 in FIG. 12. The stitching unit 1303 is configured to: stitch an image corresponding to the fixation region after the rendering and an image corresponding to the non-fixation region after the rendering, and display a stitched image on the display. For example, the stitching unit 1303 may be used to perform S1003 in FIG. 10.

In some embodiments, the non-fixation region includes a difference region and a low-definition region; the difference region is a region other than a first region in the fixation region corresponding to the display at a first moment, the first region is an overlapping region of the fixation region corresponding to the display at the first moment and the fixation region corresponding to the display at the current moment, and the first moment is the previous moment of the current moment; and the low-definition region is a region of the display other than the fixation region at the first moment and the fixation region at the current moment. The processing unit 1302 is further configured to: render the image corresponding to the fixation region and the image corresponding to the difference region at the current moment according to a first refresh rate, and render the image corresponding to the low-definition region according to a second refresh rate. The first refresh rate is greater than the second refresh rate.

In some embodiments, the processing unit 1302 is configured to: determine screen coordinates corresponding to the pupil coordinates on the display according to the pupil coordinates and a preset screen coordinate determination model, determine the size of the fixation region, and determine the fixation region according to the size of the fixation region, the screen coordinates being center coordinates of the fixation region.

In some embodiments, the processing unit 1302 is configured to determine the ratio between the fixation region and the display region of the display, the ratio satisfies a preset formula, and the preset formula is $X+X \times N+(1-2X) \times M \times N=K$, where X represents the ratio between the fixation region and the display region of the display, N represents the compression ratio of the image corresponding to the non-fixation region, M represents the refresh rate of each frame of image corresponding to the non-fixation region, and K represents the ration between the actual resolution of the electronic device at the current moment and the rated resolution of the electronic device; the processing unit 1302 determines the size of the fixation region based on the product of the ratio between the fixation region and the display region and the display region of the display.

In some embodiments, the processing unit 1302 is further configured to: determine a projection matrix of a target region according to position information of the target region, the target region being any one of the fixation region, the difference region, and low-definition region, and position information of the target region including coordinate information and size information of the target region; and determine an image corresponding to the target region according to the projection matrix of the target region.

In some embodiments, the stitching unit 1303 is configured to stitch, according to a preset format, information of the image corresponding to the fixation region after the rendering and information of the image corresponding to the non-fixation region after the rendering. The information of the image includes data of the image and a position of the image in the display region.

When the image processing device is implemented by hardware, the obtaining unit 1301 in the embodiments of the present disclosure may be integrated on a communication interface, and the processing unit 1302 and the stitching unit 1303 may be integrated on a processor. An implementation is shown in FIG. 14.

FIG. 14 is a structural schematic diagram of a possible communication device of the image processing device (which is referred to as a processing device) involved in the above embodiments. The communication device includes a processor 1402 and a communication interface 1403. The processor 1402 is used to control and manage the actions of the processing device, for example, to execute the steps performed by the processing unit 1302 and the stitching unit 1303 mentioned above, and/or to execute other processes of the technical solutions described herein. The communication interface 1403 is used to support communication between the processing device and other network entities, for example, to execute the steps performed by the above-mentioned obtaining unit 1301. The processing device may further include a memory 1401 and a bus 1404, and the memory 1401 is used to store program codes and data of the processing device.

The memory 1401 may be a memory in the processing device; the memory may include a volatile memory, such as a random access memory; the memory may also include a non-volatile memory, such as a read-only memory, a flash memory, a hard disk or a solid state disk; or the memory may also include a combination of the above-mentioned types of memory.

The processor 1402 may implement or execute various illustrative logical blocks, modules and circuits described in content of the present disclosure. The processor may be a central processing unit, a general-purpose processor, a digital signal processor, an application specific integrated circuit, a field programmable gate array, or any other programmable logic device, a transistor logic device, a hardware component or any combination thereof. It may implement or execute various illustrative logical blocks, modules and circuits described in content of the present disclosure. The processor may also be a combination that implements computing functions, for example, a combination including one or more microprocessors, a combination of a digital signal processor (DSP) and a microprocessor, or the like.

The bus 1404 may be an extended industry standard architecture (EISA) bus or the like. The bus 1404 may be divided into an address bus, a data bus, a control bus, etc. For convenience of representation, in FIG. 14, only one thick line is used for representation, but it does not mean that there is only one bus or one type of bus.

The processing device in FIG. 14 may also be a chip. The chip includes one or more than two (including two) processors 1402 and a communication interface 1403.

Optionally, the chip further includes a memory 1401. The memory 1401 may include a read-only memory and a random access memory, and provides operation instructions and data to the processor 1402. A part of the memory 1401 may also include a non-volatile random access memory (NVRAM).

In some implementation manners, the memory 1401 stores the following elements: execution modules or data structures, or their subsets, or their extended sets.

In the embodiments of the present disclosure, by calling the operation instructions stored in the memory 1401 (the operation instructions may be stored in the operating system), corresponding operations are executed.

From description of the above embodiments, those skilled in the art may clearly understand that, for convenience and brevity of description, an example is only given according to the above division of functional modules. In practical applications, the above functions are allocated to different functional modules as needed. That is, an internal structure of the device is divided into different functional modules to perform all or part of the functions described above. As for the specific working process of the above-described system, device(s), and units, reference may be made to the corresponding process of the method in the foregoing embodiments, and details are not repeated here.

Some embodiments of the present disclosure provide a computer-readable storage medium (for example, a non-transitory computer-readable storage medium), the computer-readable storage medium has stored computer program instructions, and the computer program instructions, when executed by a computer, cause the computer to perform the image processing method as described in any one of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card and a flash memory (e.g., an erasable programmable read-only memory (EPROM), a card, a stick or a key driver). Various computer-readable storage media described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure provide a computer program product, for example, the computer program product is stored in a non-transitory computer-readable storage medium. The computer program product includes computer program instructions that, when run on a computer, cause the computer to perform the method as described in any one of the above embodiments.

Some embodiments of the present disclosure further provide a computer program. When the computer program is executed by a computer, the computer program cause the computer to perform the method as described in the above embodiments.

Beneficial effects of the computer-readable storage medium, the computer program product, and the computer program are the same as the beneficial effects of the method as described in the above embodiments, which will not be repeated here.

In the embodiments provided by the present disclosure, it will be understood that the system, device and method may be implemented in other ways. For example, the embodiments of the device described above are merely exemplary. For example, the division of the units is only a logical functional division. In actual implementation, there may be another division manner. For example, a plurality of units or components may be combined or integrated into another system, or some features may be ignored or not executed. In addition, mutual coupling or direct coupling or communication connection shown or discussed above may be indirect coupling or communication connection between the device and units through some interfaces; or connections are electrical, mechanical or in other forms.

The units described as separate components may or may not be physically separated, and the components shown as units may or may not be physical units. That is, the units may be located in one place, or may be distributed to multiple network units. Part or all of the units may be selected according to actual needs to achieve the purpose of the solutions of the embodiments.

In addition, the functional units in the embodiments of the present disclosure may be integrated into a single processing unit or may be separate physical units, or two or more units may be integrated into a single unit.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An image processing method, applied to an electronic device having a display, the method comprising:
obtaining pupil coordinates of a user at a current moment;
determining a fixation region and a non-fixation region corresponding to the display at the current moment according to the pupil coordinates;
rendering an image corresponding to the fixation region according to a first resolution, and rendering an image corresponding to the non-fixation region according to a second resolution, the first resolution being greater than the second resolution;
stitching an image corresponding to the fixation region after the rendering and an image corresponding to the non-fixation region after the rendering; and
displaying a stitched image on the display; wherein
a size of the fixation region is determined according to a product of a ratio between the fixation region and a display region of the display and the display region of the display, and the ratio satisfies a preset formula, and the preset formula is:

$$X + X \times N + (1 - 2X) \times M \times N = K$$

wherein X represents the ratio between the fixation region and the display region of the display, N represents a compression ratio of the image corresponding to the non-fixation region, M represents a refresh ratio of each frame of image corresponding to the non-fixation region, and K represents a ratio between an actual resolution of the electronic device at the current moment and a rated resolution of the electronic device.

2. The method according to claim 1, wherein the non-fixation region includes a difference region and a low-definition region, the difference region is a region other than a first region in a fixation region corresponding to the display at a first moment, the first region is an overlapping region of the fixation region of the display at the first moment and the fixation region of the display at the current moment, the first moment is a previous moment of the current moment, and the low-definition region is a region of the display other than the fixation region at the first moment and the fixation region at the current moment; and the method further comprises:
rendering the image corresponding to the fixation region at the current moment and an image corresponding to the difference region according to a first refresh rate, and rendering an image corresponding to the low-definition region according to a second refresh rate, the first refresh rate being greater than the second refresh rate.

3. The method according to claim 2, further comprising:
determining a projection matrix corresponding to a target region according to position information of the target region, wherein the target region is any one of the fixation region at the current moment, the difference region and the low-definition region, and the position information includes coordinate information and size information of the target region; and
determining an image corresponding to the target region according to the projection matrix.

4. The method according to claim 3, wherein stitching the image corresponding to the fixation region after the rendering and the image corresponding to the non-fixation region after the rendering includes:
stitching, according to a preset format, information of the image corresponding to the fixation region after the rendering and information of the image corresponding to the non-fixation region after the rendering, information of each image including data of each image and a position of each image in a display region of the display.

5. The method according to claim 2, wherein determining the fixation region of the user at the current moment according to the pupil coordinates includes:

determining screen coordinates corresponding to the pupil coordinates on the display according to the pupil coordinates and a preset screen coordinate determination model;

determining a size of the fixation region at the current moment; and determining the fixation region according to the screen coordinates and the size of the fixation region at the current moment, the screen coordinates being center coordinates of the fixation region at the current moment.

6. The method according to claim 5, further comprising:

determining a projection matrix corresponding to a target region according to position information of the target region, wherein the target region is any one of the fixation region at the current moment, the difference region and the low-definition region, and the position information includes coordinate information and size information of the target region; and determining an image corresponding to the target region according to the projection matrix.

7. The method according to claim 2, wherein stitching the image corresponding to the fixation region after the rendering and the image corresponding to the non-fixation region after the rendering includes:

stitching, according to a preset format, information of the image corresponding to the fixation region after the rendering and information of the image corresponding to the non-fixation region after the rendering, information of each image including data of each image and a position of each image in a display region of the display.

8. The method according to claim 1, wherein determining the fixation region of the user at the current moment according to the pupil coordinates includes:

determining screen coordinates corresponding to the pupil coordinates on the display according to the pupil coordinates and a preset screen coordinate determination model; and determining the fixation region according to the screen coordinates and the size of the fixation region, the screen coordinates being center coordinates of the fixation region.

9. The method according to claim 8, wherein stitching the image corresponding to the fixation region after the rendering and the image corresponding to the non-fixation region after the rendering includes:

stitching, according to a preset format, information of the image corresponding to the fixation region after the rendering and information of the image corresponding to the non-fixation region after the rendering, information of each image including data of each image and a position of each image in a display region of the display.

10. The method according to claim 1, wherein stitching the image corresponding to the fixation region after the rendering and the image corresponding to the non-fixation region after the rendering includes:

stitching, according to a preset format, information of the image corresponding to the fixation region after the rendering and information of the image corresponding to the non-fixation region after the rendering, information of each image including data of each image and a position of each image in a display region of the display.

11. A non-transitory computer-readable storage medium, wherein the computer-readable storage medium has stored instructions, when the instructions are executed by a computer, the computer performs the image processing method according to claim 1.

12. A processing device, comprising a processor and a communication interface, wherein the communication interface is coupled to the processor, and the processor is used to execute a computer program or instructions to implement:

obtaining pupil coordinates of a user at a current moment;

determining a fixation region and a non-fixation region corresponding to the display at the current moment according to the pupil coordinates;

rendering an image corresponding to the fixation region according to a first resolution, and rendering an image corresponding to the non-fixation region according to a second resolution, the first resolution being greater than the second resolution;

stitching an image corresponding to the fixation region after the rendering and an image corresponding to the non-fixation region after the rendering; and displaying a stitched image on the display; wherein a size of the fixation region is determined according to a product of a ratio between the fixation region and a display region of the display and the display region of the display, and the ratio satisfies a preset formula, and the preset formula is:

$$X + X \times N + (1 - 2X) \times M \times N = K$$

wherein X represents the ratio between the fixation region and the display region of the display, N represents a compression ratio of the image corresponding to the non-fixation region, M represents a refresh ratio of each frame of image corresponding to the non-fixation region, and K represents a ratio between an actual resolution of the electronic device at the current moment and a rated resolution of the electronic device.

13. The processing device according to claim 12, wherein the non-fixation region includes a difference region and a low-definition region, the difference region is a region other than a first region in a fixation region corresponding to the display at a first moment, the first region is an overlapping region of the fixation region of the display at the first moment and the fixation region of the display at the current moment, the first moment is a previous moment of the current moment, and the low-definition region is a region of the display other than the fixation region at the first moment and the fixation region at the current moment; and the processor is used to execute the computer program or the instructions to implement:

rendering the image corresponding to the fixation region at the current moment and an image corresponding to the difference region according to a first refresh rate, and rendering an image corresponding to the low-definition region according to a second refresh rate, the first refresh rate being greater than the second refresh rate.

14. The processing device according to claim 13, wherein the processor is used to execute the computer program or the instructions to implement:

determining screen coordinates corresponding to the pupil coordinates on the display according to the pupil coordinates and a preset screen coordinate determination model;

determining a size of the fixation region at the current moment; and determining the fixation region according to the screen coordinates and the size of the fixation region at the current moment, the screen coordinates being center coordinates of the fixation region at the current moment.

15. The processing device according to claim 13, wherein the processor is used to execute the computer program or the instructions to further implement:

determining a projection matrix corresponding to a target region according to position information of the target region, wherein the target region is any one of the fixation region at the current moment, the difference region and the low-definition region, and the position information includes coordinate information and size information of the target region; and determining an image corresponding to the target region according to the projection matrix.

16. The processing device according to claim 13, wherein the processor is used to execute the computer program or the instructions to further implement:

stitching, according to a preset format, information of the image corresponding to the fixation region after the rendering and information of the image corresponding to the non-fixation region after the rendering, information of each image including data of each image and a position of each image in a display region of the display.

17. The processing device according to claim 12, wherein the processor is used to execute the computer program or the instructions to implement:

determining screen coordinates corresponding to the pupil coordinates on the display according to the pupil coordinates and a preset screen coordinate determination model; and determining the fixation region according to the screen coordinates and the size of the fixation region, the screen coordinates being center coordinates of the fixation region.

18. The processing device according to claim 12, wherein the processor is used to execute the computer program or the instructions to further implement:

stitching, according to a preset format, information of the image corresponding to the fixation region after the rendering and information of the image corresponding to the non-fixation region after the rendering, information of each image including data of each image and a position of each image in a display region of the display.

* * * * *